US012792937B2

(12) United States Patent
Councill et al.

(10) Patent No.: US 12,792,937 B2
(45) Date of Patent: Nov. 10, 2026

(54) END USER CONNECTION EVENTS

(71) Applicant: Truist Bank, Charlotte, NC (US)

(72) Inventors: Peter Councill, Richmond, VA (US); Natalie Patrice Mabe, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 663 days.

(21) Appl. No.: 18/342,164

(22) Filed: Jun. 27, 2023

(65) Prior Publication Data

US 2025/0005402 A1 Jan. 2, 2025

(51) Int. Cl.
*G06N 5/04* (2023.01)

(52) U.S. Cl.
CPC .................................... *G06N 5/041* (2013.01)

(58) Field of Classification Search
USPC ........................................................... 706/45
See application file for complete search history.

(56) References Cited

U.S. PATENT DOCUMENTS 11,240,181 B1 * 2/2022 Nagaraja ................ G06N 3/006
2019/0026758 A1 * 1/2019 Ram Bhuyan ..... G06Q 30/0201
2021/0360106 A1 * 11/2021 Matula .................... G06F 40/51
2022/0101839 A1 * 3/2022 George .................... G06N 5/02
2023/0092702 A1 * 3/2023 Mao ........................ G06F 40/30
704/9

* cited by examiner

*Primary Examiner* — Brandon Hoffman
(74) *Attorney, Agent, or Firm* — Michael A. Springs, Esq.; Shumaker, Loop & Kendrick, LLP; Patrick B. Horne

(57) ABSTRACT

Disclosed are systems and methods for detecting and tracking end user connection events. The connection event data can be displayed on a dashboard graphical user interface and used by a provider to test and implement system enhancements and optimizations, such as improved chat bots, training modules, or process improvements.

20 Claims, 8 Drawing Sheets

END USER CONNECTION EVENTS

TECHNICAL FIELD AND BACKGROUND

The present invention relates generally to the field of detecting, recording, tracking, and implementing connection events between a provider and an end user through the use of artificial intelligence and natural language processing technology.

An effective connection between a provider and an end user is essential to facilitate the exchange of data and information and to permit the efficient rendition of services. Conventional techniques for creating a connection are generalized and do not address individual end user attributes, circumstances, or needs. As a result, provider-end user connections are not optimized.

It is, therefore, an object of the present invention to provide systems and methods that detect and track when a connection event has occurred. The connection event is categorized, sequenced, and output to a dashboard graphical user interface for review by a provider. If the connection event had a positive effect, the provider can generate an experimental hypothesis to test whether repeated execution of the connection event would continue to have a positive effect. If testing shows that "success criteria" are met, and the connection event had a positive impact, the provider and implement the connection event as a process improvement or integrate the connection event with a chat bot that executes operational instructions to carry out the connection event. The provider can further develop electronic training modules that include operational instructions for provider agents to implement and learn how to repeat the connection events.

SUMMARY

According to one embodiment, a system for processing interactive content data generated during a shared experience includes a provider computer having one or more integrated software applications that perform operations to implement the present systems and methods. Content data files can be alphanumeric text transcriptions of audio discussions between a user and a provider agent or virtual agent or records of written communication between a user and a provider (e.g., emails, SMS text messages, instant chat messages, or messages sent over a social media platform). The computer actives a digital recorder that captures interactive communications and stores the interactive communications to the memory device as an interactive content file.

The computer process the interactive content data file to detect connection event data representing a connection event within the interactive content file as well as a sequence data range designating a beginning and end for the connection event. The system also generates a connection event subject identification associated with the connection event data that classifies the connection event according to one of a plurality of categories. The system generates a connection event dashboard graphical user interface ("GUI") displayed on the screen of an agent computer that shows the event subject identifications as a function of sequence data (e.g., the type of connection events that occur over various time periods).

In another embodiment, the system is used to generate an experimental hypothesis using the connection event data. More specifically, if a connection event is observed to have a net positive effect on end user sentiment or system efficiency or efficacy, the provider can develop an experimental hypothesis that is tested in a production environment.

That is, the connection event is repeated to generate interactive content data in a production environment, and the interactive content data is analyzed to determine if the positive effects are repeatable. The experimental hypothesis includes operational instructions for implementing the connection event by an agent using an agent computer. The experimental hypothesis also includes conditional data specifying conditions that must be met before the operational instructions are executed—that is, what conditions or circumstances must be observed before the connection event is performed.

The experimental hypothesis also includes success criteria that is satisfied or not based on the interactive content data. For instance, the success criteria can include determining if performing the connection event resulted in better end user sentiment or a reduced amount of time required to service the customer. The experimental hypothesis is transmitted to the agent computer, which generates production interactive content data by executing the operational instructions when the conditional data is met. The production interactive content data is analyzed to determine whether the success criteria is satisfied.

When a provider determines that a connection event should be repeated by agents using agent computers, the provider system can use the connection event data to generate both (i) operational instructions for implementing the connection event by an agent computer, and (ii) conditional data specifying conditions that must be met before the operational instructions are implemented. The operational instructions and conditional data can be integrated with a chat bot software application that executes the operational instructions when the conditional data is met. In this manner, the connection event is automated by the chat bot software application.

In another embodiment, the provider creates an electronic training module used to teach agents how to execute the connection event. The system uses the connection event data to generate a training module that comprises (i) operational instructions for implementing a connection event by an agent computer, (ii) conditional data specifying conditions that must be met before the operational instructions are executed, and (iii) training material data, such as documents, videos, audio files, or reference materials used for instruction. The training module is transmitted to the agent computer that executes the operational instructions when the conditional data is met.

The system can rely on artificial intelligence to recognize connection events or other functions as part of system operation. In one embodiment, the system computer includes a first neural network that is used to detect the connection event data. The first neural network is selected from one of (i) a multilayer perceptron network having three or more layers and that utilizes a nonlinear activation function, (ii) a convolutional neural network; (iii) a recursive neural network, (iv) a recurrent neural network; (v) a Long Short-Term Memory network architecture, or (vi) a Bidirectional Long Short-Term Memory network.

In another aspect of the system, the computer can include a second neural network that determines the connection event subject identification—i.e., the type of connection event. The second neural network is selected from one of (i) a Latent Semantic Analysis network, (ii) a Probabilistic Latent Semantic Analysis network, or (iii) a Latent Dirichlet Allocation. network.

In yet another aspect of the invention, the system determines sentiment data corresponding to the connection event and displays the sentiment data on the dashboard GUI. The system can comprises a neural network used to determine the sentiment data. The neural network is selected from one of (i) a Naive Bayes, Support Vector Machine that uses logical regression, (ii) a convolutional neural network, (iii) a lexical co-occurrence network, or (iv) a Long Short-Term Memory network.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
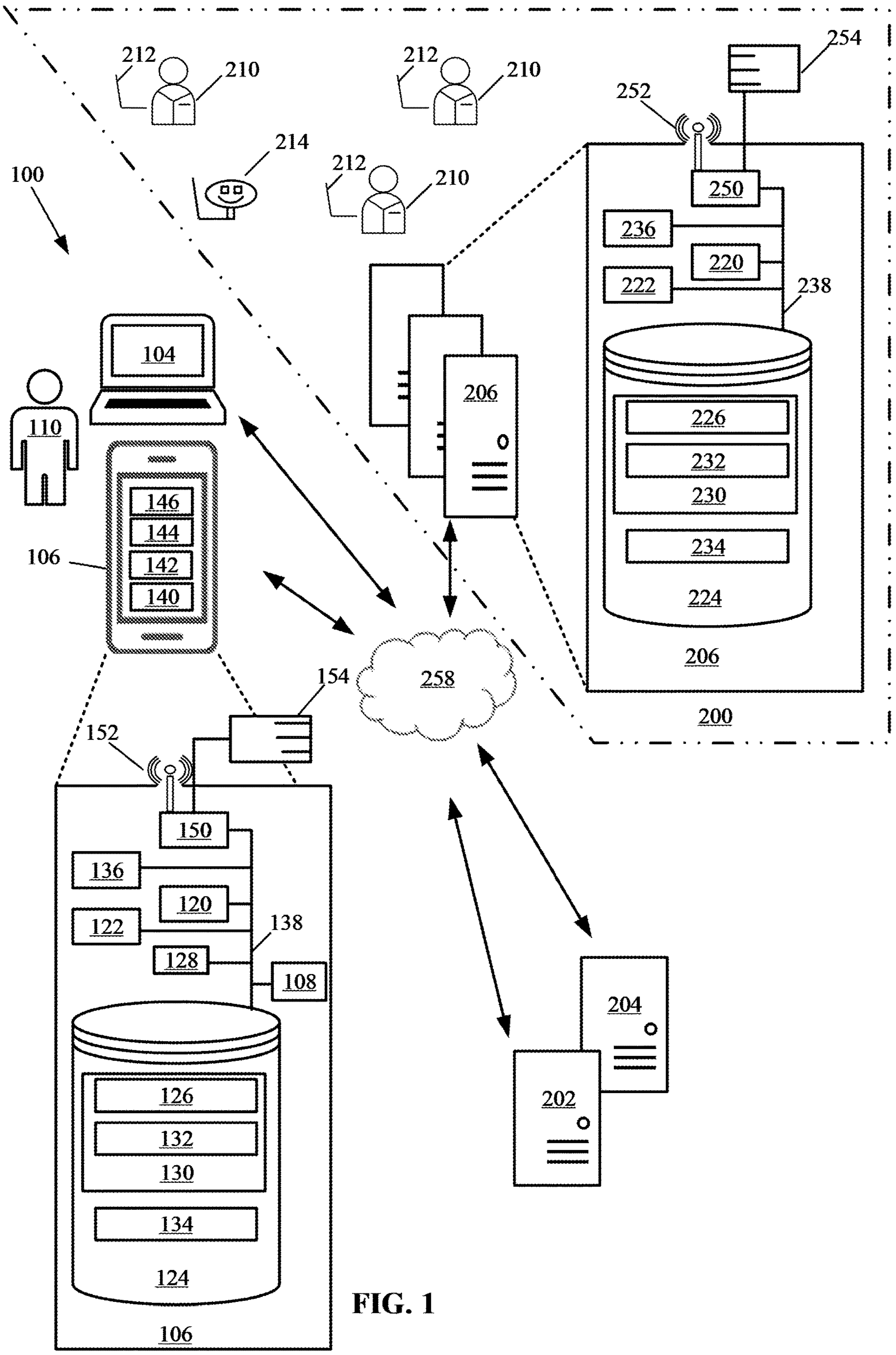
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. Interactions between a provider and its customers or users, can be referred to as a "shared experience" during which a connection event can occur. Shared experiences result in the generation of interactive content data through the exchange of verbal or written communications and expressions of ideas that are converted to, and stored as, interactive content data that can include machine encoded alphanumeric text data, such as a transcript. The interactive content data may include connection event data representing the occurrence of a particular event that created a connection between provider agents and an end user. Shared experiences can include, for example, sales calls or a provider rendering support services to a customer.

The term "agent" generally describes an individual who interfaces with the customer to provide services using the systems and methods described herein, and the term is used interchangeably with the terms associate or representative. The term "user" is used interchangeably with the terms end user, customer or consumer and represents individuals to whom a provider is rendering goods or services or individuals, with whom the provider has an ongoing relationship, and who contact a provider by telephone, video chat, email, text, or an instant message software application to request assistance with provider products and services. The term "participants" is used interchangeably with the term "content sources" and refers to humans or automated software technology (e.g., a chat bot) that generate linguistic expressions of ideas that can be processed using artificial intelligence and natural language processing technologies. For instance, content sources can include an agent and a customer or end user generating interactive content data as part of a shared experience.

The term "content" or "interactive content data" is used to generally refer to alphanumeric text in digital form and can be used interchangeably with the terms machine-encoded text data, alphanumeric content data, alphanumeric text content, alphanumeric textual content data, content data, interactive content data, textual content data, textual data, and text content data. These terms for content can be used interchangeably with the term "transcript data" where the terms are being used to refer to a written digital record, in text form, of a single speaker or a written or verbal interaction between multiple participants in a conversation or discussion. Content can be generated by transcribing an oral interaction during a shared experience by telephone or video conference, or generated during written exchanges by email, instant "chat" messaging, short message service ("SMS"), or messages exchanged through various online platforms or social media software applications.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

Disclosed are systems and methods for detecting, classifying, and utilizing connection event data that is recorded by a provider agent or that is stored as part of interactive content data. The systems utilize artificial intelligence and natural language processing technology to recognize, classify, and utilize the connection event data. The example embodiments discussed herein are generally described with reference to interactive content data generated from a transcript of a written or verbal interactive exchange between conversation participants or "content sources." The content data is interactive in that the data is generated from an interaction between two content data sources, such as a provider agent and end user or a chat bot and an end user. Examples of interactive content data include, but are not limited to, an exchange of instant chat messages between two or more participants or recorded audio data generated during a telephone call (e.g., a consumer support request or help desk call), or a video conference. Those of skill in the art will appreciate that the example embodiments are not intended to be limiting, and the systems and methods can be applied to other types of alphanumeric content data.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 &106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (e.g., DBSCAN), mean shift clustering, expectation maximization (e.g., EM) clustering using Gaussian mixture models (e.g., GMM), agglomerative hierarchical clustering, or the like. In one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Figure 2A:
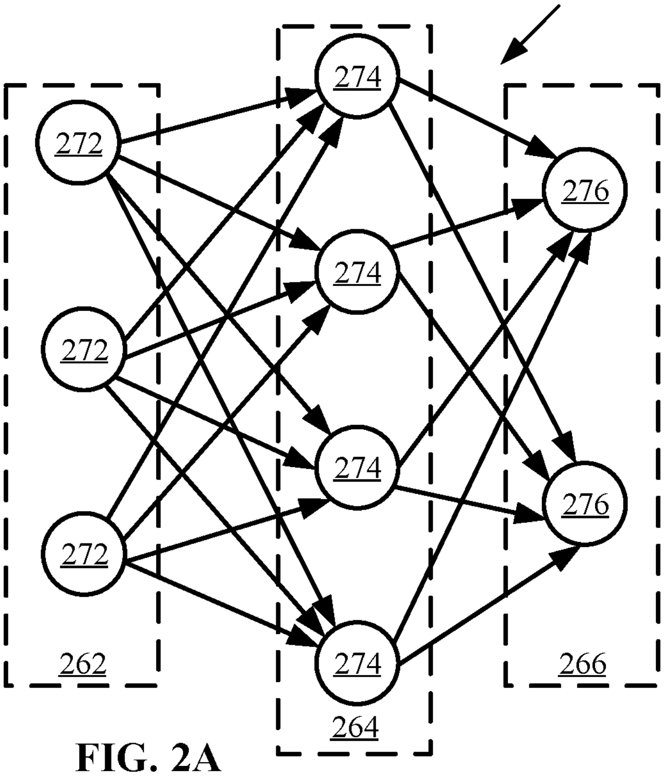
FIG. 2A is a diagram of a feedforward network, according to at least one embodiment, utilized in machine learning.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2C:
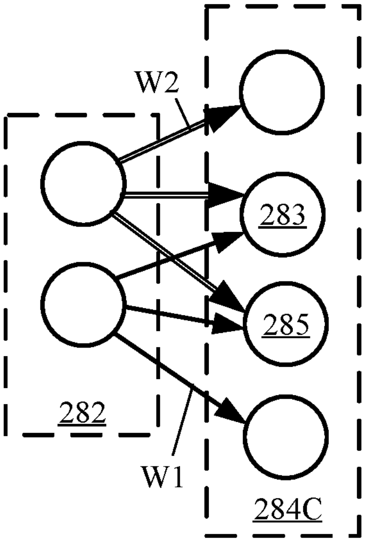
FIG. 2C is a diagram of a portion of the convolution neural network of FIG. 2B, according to at least one embodiment, illustrating assigned weights at connections or neurons.
Figure 2B:
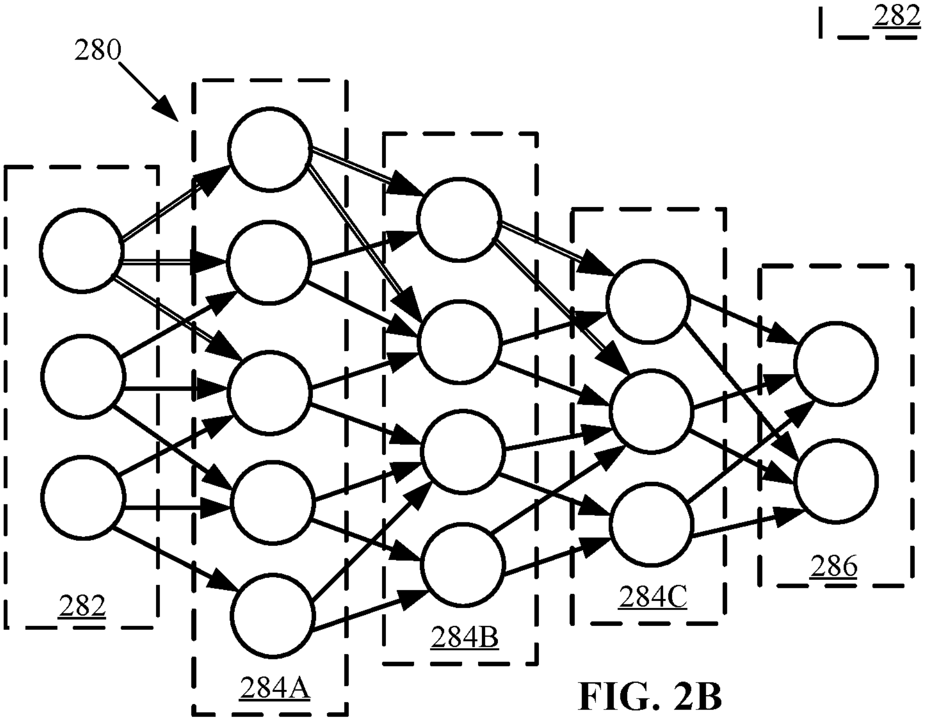
FIG. 2B is a diagram of a convolution neural network, according to at least one embodiment, utilized in machine learning.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
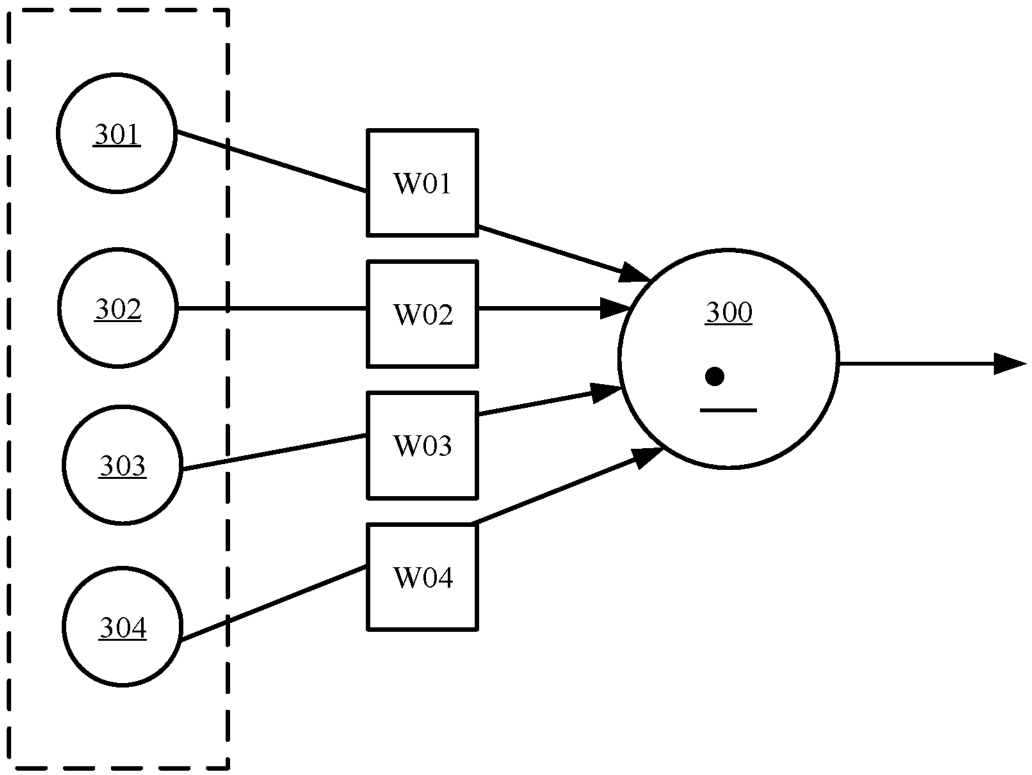
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
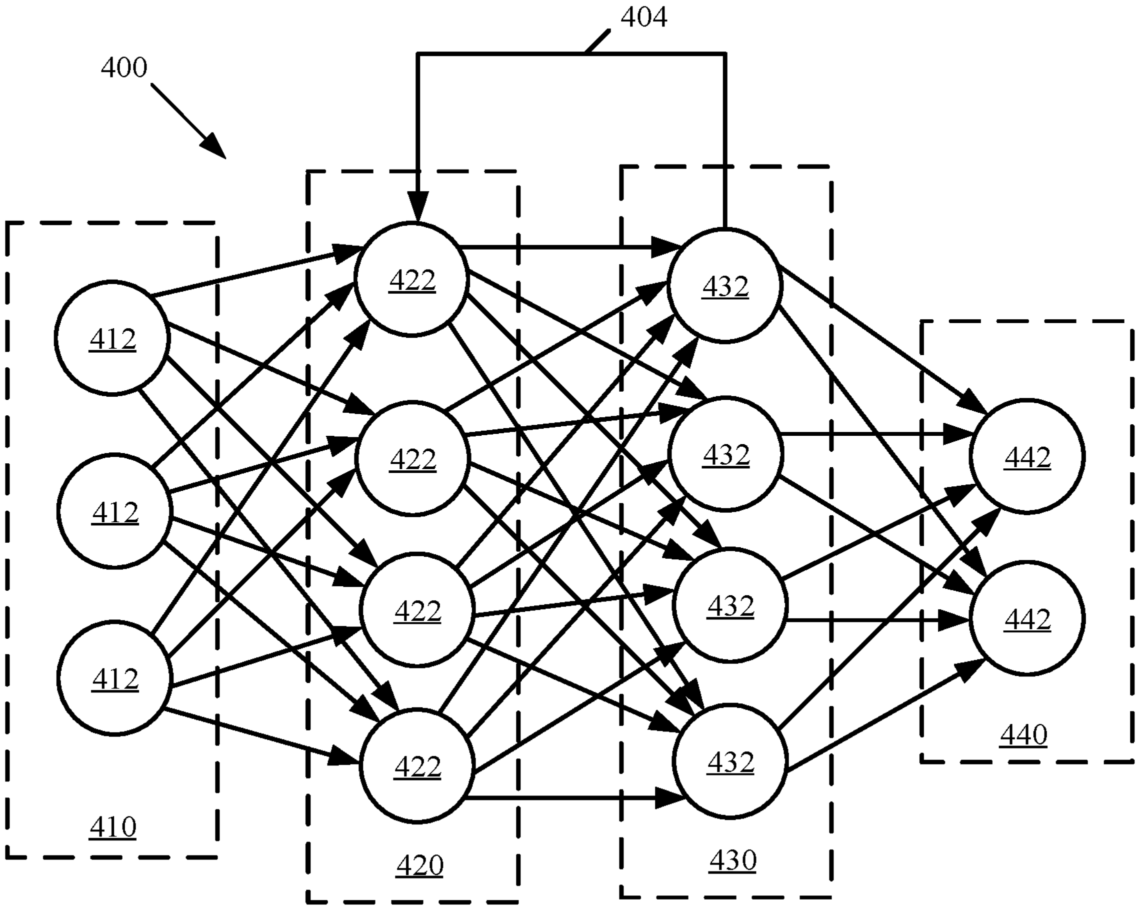
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
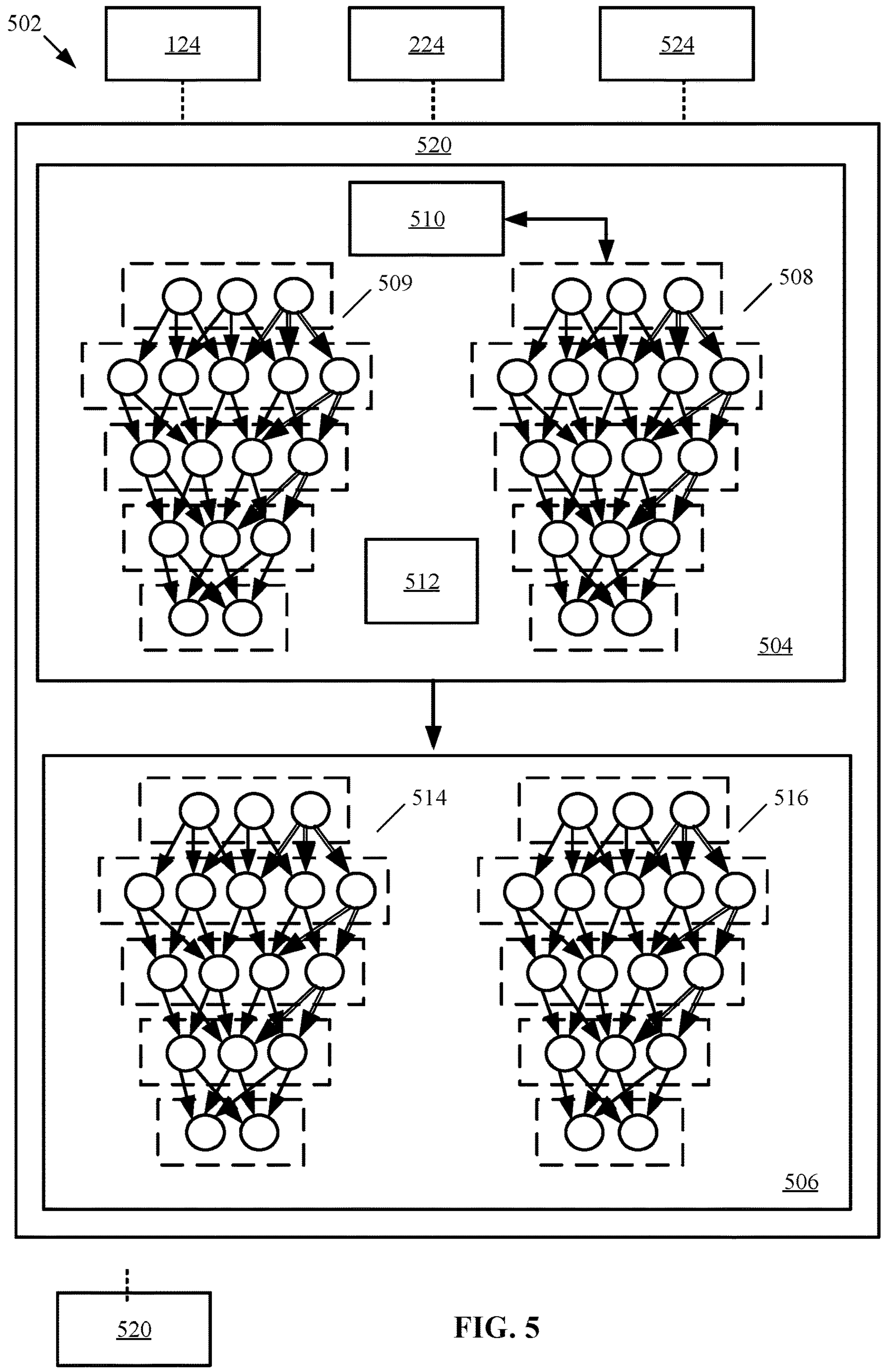
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation, such as natural language processing). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on Kmeans clustering software processing techniques.

Figure 6:
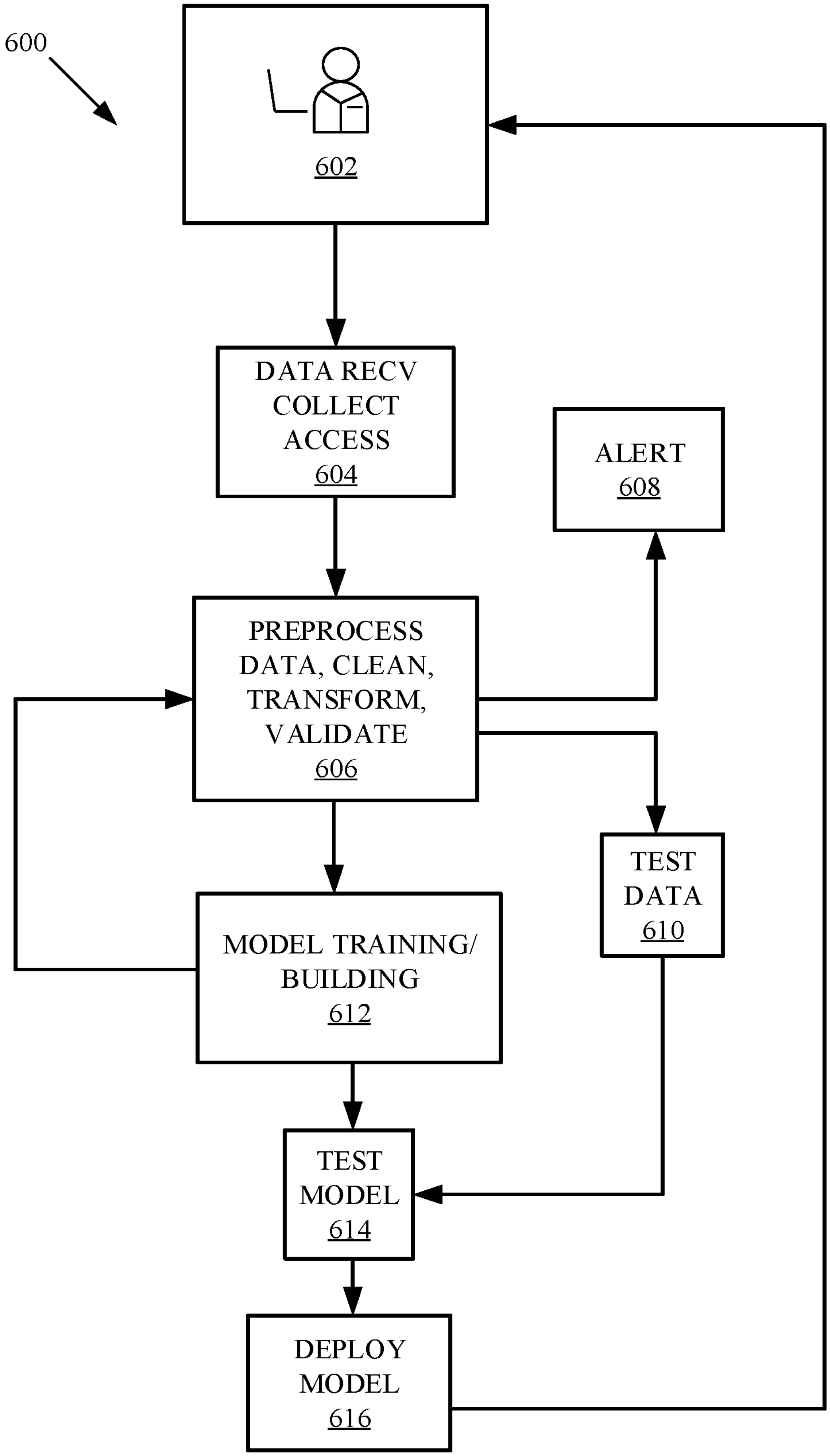
FIG. 6 is a flow chart representing a method model development and deployment by machine learning.

Turning to FIG. 6, a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation to confirm that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations. When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Natural Language Processing

Neural Network Architectures and Natural Language Processing

The system processes the interactive content data using natural language processing technology that is implemented by one or more artificial intelligence software applications and systems. The artificial intelligence software and systems are in turn implemented using neural networks. Natural language processing technology analyzes one or more content data files that include alphanumeric textual data composed of individual communication elements, such as words, symbols or numbers. Natural language processing software techniques are implemented as unsupervised learning techniques that identify and characterize hidden structures of unlabeled interactive content data, or supervised techniques that operate on labeled interactive content data and include instructions informing the system which outputs are related to specific input values.

Supervised software processing can rely on iterative training techniques and training data to configure neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance when enough labeled data is available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together which then give insights into the subjects of those words and documents.

Unsupervised learning software systems can perform training operations on unlabeled data and require less time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM").

Clustering software techniques can automatically group semantically similar user utterances together to accelerate the derivation and verification of an underneath common user intent—i.e., ascertain or derive a new classification or subject, and not just classification into an existing subject or classification. Unsupervised learning software systems are also used for association rules mining to discover relationships between features from content data. At times, unsupervised learning software systems can be less accurate than well-trained supervised systems.

The system utilizes one or more supervised or unsupervised software processing techniques to perform a subject classification analysis to generate subject data. Suitable software processing techniques for subject classification can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together which then give insights into the subjects of those words and documents. The system can utilize software processing techniques that include Non-Matrix Factorization, Correlated Topic Model ("CTM"), and KMeans or other types of clustering.

Content Data Pre-Processing Vectorization, and Segmentation

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user, and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

To facilitate natural language processing, the system can be configured to perform vectorization on reduced content data to map the alphanumeric text into a vector or matrix form. One approach to vectorising content data includes applying "bag-of-words" modeling. The bag-of-words approach counts the number of times a particular word or "communication element" appears in content data to convert the words into a numerical value. The bag-of-words model can include parameters, such as setting a threshold on the number of times a word must appear to be included in the vectors.

In some embodiments, vectorization includes determining a weighted frequency occurrence of all machine encoded communication elements in a corpus of content data. The frequency, or number of occurrences, for each machine encoded communication element is determined. The frequencies of each machine encoded communication element are divided by the highest frequency to generate the weighted frequency occurrence for each machine encoded communication element. The communication elements are then placed into a matrix format.

Vectorization can be better understood with reference to the following simplified example. A corpus of machine encoded communication elements might include the following where each sentence is a row in a matrix: [I, forgot, my, account, password || The, account, is, locked || Please, reset, my, password, and, account]. Each machine encoded communication element can then be replaced by its frequency, such as: [1, 1, 2, 3, 2 || 1, 3, 1, 1 || 1, 1, 2, 2, 1, 3]. Here, the highest frequency is three, so each frequency value is divided by 3 to yield: [0.33, 0.33, 0.66, 1, 0.66 || 0.33, 1, 0.33, 0.33 || 0.33, 0.33, 0.66, 0.66, 0.33, 1].

In other examples, the vectorization creates a "sparse matrix" where each sentence, or row of the matrix, includes a frequency value for all distinct machine encoded communication elements within the corpus of content data. Where a communication element does not appear in a sentence, the frequency of the communication element is set to zero. Continuing with the foregoing example, the distinct communication elements include [I, forgot, my, account, password, the, is, locked, please, reset, and]. Each sentence is represented as follows: [1, 1, 1, 1, 1, 0, 0, 0, 0, 0, 0 || 0, 0, 0, 1, 0, 1, 1, 1, 0, 0, 0 || 1, 1, 2, 2, 1, 3 || 0, 1, 1, 1, 0, 0, 0, 1, 1, 1].

Techniques to encode the context of machine encoded communication elements determine how often machine encoded communication elements appear together. Determining the adjacent pairing of machine encoded communication elements can be achieved by creating a co-occurrence matrix with the value of each member of the matrix counting how often one machine encoded communication element coincides with another, either just before or just after it. That is, the words or machine encoded communication elements form the row and column labels of a matrix, and a numeric value appears in matrix elements that correspond to a row and column label for communication elements that appear adjacent in the content data.

As an alternative to counting communication elements (i.e., words) in a corpus of content data and turning it into a co-occurrence matrix, another software processing technique is to use a communication element in the content data corpus to predict the next communication element. Looking through a corpus, counts are generated for adjacent communication elements, and the counts are converted from frequencies into probabilities (i.e., using n-gram predictions with Kneser-Nay smoothing) using a simple neural network. Suitable neural network architectures for such purpose include a skip-gram architecture. The neural network is trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a Uniform Manifold Approximation and Projection algorithm ("UMAP") can be applied to reduce dimensionality while maintaining essential information.

Prior to conducting a subject analysis, the system can further perform segmentation of the content data. A segment analysis segments or divides a content data into logical sections or components. The segmentation can be based on structure of the content data, such as lines between text, segment titles and headings, line breaks, indentations, or combinations of such features. In one embodiment, the segments are identified using a categorizer that can be, for example, a probabilistic latent semantic analysis ("PLSA") model trained on a set of segment categories, such as identifying chapters, headings, subheadings, paragraphs, lines of text, or individual words. In one embodiment the categorizer is trained to detect the beginning of each section, for example, by classifying each group of machine encoded communication elements or lines as being a segment identification or not (i.e., words or symbols denoting a segment of the content data).

Two techniques for segmentation include geometric segmentation and logical segmentation. According to geometric segmentation, an interactive content data file is split into text and non-text based on its geometric structure. Geometric segmentation can be used to identify encoded components that use shapes, symbols, and the like, such as images, symbols, logos, or the like within content data that might be used to denote various headings, subheadings, or sections. A logical segmentation is based on its logical labels such as "call start," "call stop," "opening," "resolution," or other logical components of the content data that represents a shared experience between an user and a provider agent. Logical segmentation is a process of splitting digital text into words, sentences, paragraphs, topics or meaningful sections.

Identifying the structure of content data can rely on an analysis of font sizes or machine encoded communication element positioning. In one example embodiment content data parameters such as character size and spacing between characters, or words and lines are used to represent document physical layout.

In one embodiment, the system relies neural networks trained with annotated data that identify divided sections. The system can include separate software modules for line and section classification. The line classification software module itself includes a features extractor and line classifier module. The features extractor takes layout information and text as input. Based on heuristics, the feature extractor software module extracts features from layout information and text. Features include text length, the number of noun phrases, font size, higher line space, bold, italics, colon, and number sequence at the beginning of a line. The line classification module implements multiple classifiers using techniques such as support vector machines, decision tree, Naive Bayes, and Recurrent Neural Networks.

The outputs of the line classifier module can be segment data identifications and standard machine encoded communication element characters. The segment data identifications may be top-level categorization segment or a sub-segment. The segment classifier module of the segment classification sub unit takes section segment data identifications as input and classifies them as top-level, sub-segments or a top-level segment identification using RNN. The segment classification software module also has a Segment Boundary Detector that detects the boundary of a segment using different level of segment headers and regular text. It generates physically divided segment and finds relationship among top-level, segments and sub-segments. It also generates an index from an interactive content data file based on the relationship among different levels of segment.

In some embodiments, a semantic annotation software module annotates each divided section with a semantic name. The software module has a semantic labeling module that implements a Latent Dirichlet Allocation ("LDA") topic modeling technique to yield a semantic concept from each of the sections and annotates each section with a semantic concept understandable to system users.

Post processing steps can include: (i) thresholding to create a binary map from the predictions output by the network; (ii) morphological operations that analyze and process geometric structures within the image data (e.g., lines for handwriting, boxes for user inputs, provider logos, etc.); (iii) connected component analysis used to filter out small connected components; and (iv) shape vectorization to transform detected regions into a set of coordinates where "blobs" in the image data are extracted as polygonal shapes, such as lines or quadrilaterals.

In addition to segmenting the interactive content data file into logical sections or components, the system can extract content data by grouping machine encoded characters into words or groups of words that comprise the content data. To illustrate with a simplified example, the system processes an interactive content data file using a content recognition analysis to identify the individual machine encoded characters, such as a series of characters "P," "a," "t," "r," "i," "c," and "k." The machine encoded characters are grouped into words and groups of words are identified as one or more clusters. Thus, the string of machine encoded characters above is recognized as a name "Patrick." The name Patrick is identified as a name with semantic and heuristic processing techniques and grouped with additional words to identify a full cluster, such as the individual name "Patrick Smith" or the business name "Patrick Family Restaurants."

Grouping machine encoded characters into words can be performed using natural language processing technology alone or in combination with segmentation software processing techniques. In one embodiment, grouping machine encoded characters can be performed by an extraction software module that is trained to label words and clusters according to classifications of content data, such as an end user identification, a product identification, or an agent identification, among other categories. The extraction software module can be implemented with a rule-based software technique, with probability models implemented by neural networks, such as Conditional Random Field system, or with combinations of rule-based techniques and neural networks.

Generating words can also be performed by detecting white spaces between machine encoded characters. Morphosyntactic analysis entails identifying candidate parts of speech ("POS") for each word, such as noun (e.g., a transfer source identification) or a verb (e.g., as part of a transfer instruction). This may performed using a rules-based software engine alone or in combination with a hidden Markov model.

The segment analysis and word extraction can generate map index data that identifies the locations of segments and words within content data representing a shared experience. For example, each machine encoded communication element (including spaces between words) can be indexed in a sequence using a time code of when a communication element was generated during a provider-customer interaction.

Subject Identification and Content Data Concentration

Prior to conducting a subject analysis to ascertain subject identifications in the content data (i.e., topics or subjects addressed in the content data), the system can perform a concentration analysis on the content data. The concentration analysis concentrates, or increases the density of, the content data by identifying and retaining communication elements having significant weight in the subject analysis and discarding or ignoring communication elements having less weight.

The content analysis can alternatively be referred to as "extraction" insofar as the analysis can, in some embodiments, entail extracting words or sentences having a weight (i.e., importance) above or below a specified threshold. The extraction thus identifies and stores content data elements having the most importance so the content data is preserved and used for further processing. Put another way, the concentration analysis can remove words, sentences, paragraphs, or segment having the least importance leaving content data of higher "concentrated" importance. Or alternatively, content data having the highest importance can be extracted and stored in a separate file.

The system can perform the concentration analysis according to various categories. For instance, the interactive content data file can be associated with an agent identification or end user identification data. In that case, interactive content data associated with the agent identification (i.e., content data generated from the agent communications) can be concentrated separately from the content data generated by the end user communications. The result is that the agent or end user sentences or words carrying the most importance or weight are preserved for analysis.

The concentration analysis improves the efficiency and accuracy of a subsequent subject classification analysis, sentiment analysis, polarity analysis, or comparison by filtering out and excluding communication elements (e.g., words, phrases, symbols, or numerical values) that do not appreciably contribute to the subjects, interaction drivers, sentiment identifications, or polarity reflected in the content data. The concentration analysis helps to ensure that certain communication elements of limited or no relevance do not factor into the subject or sentiment analyses, thereby changing the results in a manner that leads to inaccuracies. The concentration analysis also enhanced, or densifies, the results that are obtained.

To illustrate, a user can initiate a support request to report that the user intends to travel and to thus request that the provider authorize transactions outside of the user's normal geographic area. In that case, words relating to geographic locations or travel might appear frequently in the content data and represent, for instance, five percent (5%) of the communication elements in the content data. But after removing communication elements as a result of the concentration analysis, the frequency of words relating to location or travel might increase to eight percent (8%) of all communication elements in the content data. In this manner, the frequency, or relative importance, of certain communication elements is enhanced as lending support to the results of the subject classification, sentiment, or polarity analyses.

In one embodiment, the concentration analysis includes executing a frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The tf-idf is represented by a statistical value that increases proportionally to the number of times a word appears in the content data. This frequency is offset by the number of separate content data instances that contain the word, which adjusts for the fact that some words appear more frequently in general across multiple content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight.

In another embodiment, the concentration analysis determines the sum of frequencies or the weighted frequency occurrence values for each row of a matrix representing content data. Referring to the example above relating to a password reset, the frequency value for each matrix row (corresponding to a sentence) is: [3 || 2 || 3.33]. The sum of the weighted frequencies is taken as a relative importance of each sentence in a corpus of communication elements. To concentrate the communication elements, the last sentence alone or in combination with the first sentence (i.e., the sentences with the highest weights) can be extracted and stored to a database for further processing. In this manner, the content data is concentrated by eliminating one out of the three original matrix rows (sentences) resulting in a 20% to 30% reduction in the data. In other embodiments, the system utilizes a frequency threshold and only extracts and store sentences that have a total frequency value, or total weighted frequency occurrence value, above the threshold.

In other embodiments, the concentration analysis can utilize neural networking techniques to evaluate the relative importance of each sentence in a content data file. The concentration analysis can then extract and store to a database a set number of sentences with the highest importance scores or those sentences having a score above a predetermined threshold. The content data file is subject to a reduction analysis described above as well as other preprocessing techniques, such as Part of Speech tagging.

Next, each sentence in a content data file is converted to a feature vector. Each feature vector comprises a series of numeric values where each of the numeric values represent a quantization of a sentence feature. For example, a tf-idf analysis can be used to determine the communication elements having the highest frequencies in a content data file, such as "password" and "account," if such words occur in the content data at a high frequency. The number of high-frequency communication elements in each sentence is determined and used as a value in the feature vector. The following sentence, for example, would have a first feature value of two (2): "Please reset my account password." Other features could include, without limitation: (i) sentence positioning, such as a sentence being positioned fourth (4th) out of one-hundred (100) sentences within the text data where "4" would be a feature value in the feature vector; (ii) the number of communication elements in a sentence so that longer sentences have a higher feature value (i.e., a sentence of 5 words would have a feature vector value of "5"; (iii) sentence position within a single paragraph; (iv) the number of nouns in a sentence; or (v) the number of numerals or numbers within a sentence.

Each feature vector can be processed by a neural network in which feature vector values for each sentence are multiplied by trained weights for each node in the network. The output of the neural network could be a probability that the sentence relates to the overall subject of the content data file or another quantitative measure of sentence relevance. Suitable neural networks could include, but are not limited to, a Restricted Boltzmann Machine, a convolutional neural network, or a recurrent neural network, as discussed more fully below.

In other embodiments, the concentration analysis can utilize neural networks to generate new groups of communication elements or sentences that summarize a content data file. For example, sequence-to-sequence modelling utilizes two groups of one or more neural networks—a first group of neural networks that implement an encoder and a second group that implements a decoder. Suitable neural networks include a Long-Short-Term Memory network architecture, a recurrent neural network, or a gated recurrent neural network. The encoder reads the entire input sequence of communication elements where at each timestep, one communication is fed into the encoder. The encoder then processes the input at every timestep and captures the contextual information present in the input sequence. The decoder reads the entire input sequence and predicts the next communication element in the sequence given the previous word. The resulting output is a series of communication elements that summarize the input content data.

The concentrated content data is processed using a subject classification analysis to determine subject identifications (i.e., topics) addressed within the content data. The subject classification analysis can specifically identify one or more interaction driver identifications that are the reason why a user initiated a shared experience or support service request. An interaction driver identification can be determined by, for example, first determining the subject identifications having the highest weight quantifiers (e.g., frequencies or probabilities) and comparing such subject identifications against a database of known interaction driver identifications. To illustrate, the subject identifications from a shared experience having the five (5) highest frequencies or probabilities might include "forgot password," "report fraud," "the weather," "children," and "sports." The provider system compares the top five subject identifications against a list of known interaction driver identifications that includes "forgot password" and "report fraud" as a known support driver but not "weather," "children," and "sports." In that instance, the provider system identifications the two support drivers as being "forgot password" and "report fraud."

In one embodiment, the subject classification analysis is performed on the content data using a Latent Drichlet Allocation analysis to identify subject data that includes one or more subject identifications (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The system can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used).

Alternatively, instead of selecting a pre-determined number of communication elements, post-clustering concentration analysis can analyze the subject vectors to identify communication elements that are included in a number of subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is, thus, turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a weighting quantifier or score for the given subject identification, which is taken as subject weighting data. A similar analysis can be performed on vectors created through other processing, such as Kmeans clustering or techniques that generate vectors where each word in the vector is replaced with a probability that the word represents a subject identification or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subject identifications may be substantially different, with some subjects having orders of magnitude fewer subject vectors than others. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content data can be visualized and subject to a reduction into two dimensional data using a Uniform Manifold Approximation and Projection algorithm ("UMAP") to generate a cluster graph visualizing a plurality of clusters. The system feeds the two dimensional data into a Density Based Spatial Clustering of Applications with Noise algorithm ("DBSCAN") and identify a center of each cluster of the plurality of clusters. The process may, using the two dimensional data from the UMAP and the center of each cluster from the DBSCAN, apply a KNN algorithm to identify data points closest to the center of each cluster and shade each of the data points to graphically identify each cluster of the plurality of clusters. The processor may illustrate a graph on the display representative of the data points shaded following application of the KNN.

The system service further analyzes the content data through, for example, semantic segmentation to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The system can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The system can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the system to identify various content sources within the content data. NER techniques are utilized to classify a given word into a category, such as a person, product, organization, or location. Using POS and NER techniques to process the content data allow the system to identify particular words and text as a noun and as representing a person participating in the discussion (i.e., a content source).

Sentiment Analysis and Relatedness

The system service can also perform a sentiment analysis to determine sentiment from the content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

Polarity-type sentiment analysis (i.e., a polarity analysis) can apply a rule-based software approach that relies on lexicons, or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identification. The polarity identification can correlate to a polarity score or polarity score range according to settings predetermined by an enterprise. For instance, a polarity score of +5 to +9 may correlate to a polarity identification of "positive," and a polarity score of +10 or higher correlates to a polarity identification of "very positive."

To illustrate a polarity analysis with a simplified example, the words "great" and "fast" might be assigned a positive score of five (+5) while the word "failed" is assigned a score of negative ten (−10) and the word "lost" is assigned a score of negative five (−5). The sentence "The agent failed to act fast" could then be scored as a negative five (−5) reflecting an overall negative polarity score that correlatives to a "somewhat negative" polarity indicator. Similarly, the sentence "I lost my debit card, but the agent was great and got me a new card fast" might be scored as plus five (+5) reflecting a positive sentiment with a positive polarity score and polarity identification.

The system can also apply machine learning software to determine sentiment, including use of such techniques to determine both polarity and emotional sentiment. Machine learning techniques also start with a reduction analysis. Words are then transformed into numeric values using vectorization that is accomplished through a bag-of-words model, Word2Vec techniques, or other techniques known to those of skill in the art. Word2Vec, for example, can receive a text input (e.g., a text corpus from a large data source) and generate a data structure (e.g., a vector representation) of each input word as a set of words.

Each word in the set of words is associated with a plurality of attributes. The attributes can also be called features, vectors, components, and feature vectors. For example, the data structure may include features associated with each word in the set of words. Features can include, for example, size (e.g., big or little, long or short), action (e.g., a verb or noun), etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

Neural networks are trained using training set content data that comprise sample words, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

In some embodiments, the system can determine relationships between and among subject identifications and sentiment identifications. Determining relationships among identifications can be accomplished through techniques, such as determining how often two identification terms appear within a certain number of words of each other in a set of content data packets. The higher the frequency of such appearances, the more closely the identifications would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Content Data Comparisons

The system evaluates an quantifies equivalence of content data, such as comparing one content file representing a first shared experience against a second content data file representing a second share experience. The system, thus, evaluates the equivalence of two shared experiences by comparing the language used (i.e., content data) during the shared experiences. Software analysis techniques for evaluating equivalence, include, without limitation, Recall Oriented Understudy for Gisting Evaluation ("Rouge") and Bilingual Evaluation Understudy ("Bleu").

Both Rouge and Bleu software analysis techniques utilize n-gram co-occurrence statistic ranging from 0 to 1. A metric value of "1" denotes that content data is exactly the same, and a metric value of "0" denotes there are no similarities in the content data. The software analysis techniques compare reference content data (called "R" for illustration purposes) against a candidate set of content data (called "C" for illustration purposes).

The "Rouge-N" technique determines the number of matching n-grams (i.e., groups of words) between two instances of content data, such as comparing two content data files, two sentences, or another component of segmented content data. Rouge techniques determine metrics that include precision, recall, and a F-1 score of matching n-grams.

Rouge techniques are illustrated with the following simplified examples using a R content data set of "I forgot my password" and a C content data set of "I cannot remember my password." The R content data set includes four words, or n-grams, which can also be called 1-grams or unigrams. The C content data set has five words, or unigrams. The content data sets share three unigrams in common—"I," "password," and "my."

The Rouge-1 precision is computed as the ratio of the number of unigrams in the C content data set that also appear in the R content data set divided by the number of unigrams in the C content data set, which here is 3/5 or 0.6. The Rouge-1 recall is computed similarly, but the number of common unigrams is divided by the number of unigrams in the R content data set, which here is 3/4 or 0.75. The Rouge F-1 metric is computed using the standard F1-score formula: F1-score=2*(precision*recall)/(precision+recall).

The Rouge-2 metrics are computed in a similar fashion using groups of two adjacent words. Here, the two content data sets have in common only the 2-gram "my password." The R content data set has three 2-grams: "I forgot," "forgot my," and "my password." The recall would thus be 1/3, or 0.333. Other Rouge software analysis techniques can include Rouge-L comparing the longest common, non-consecutive n-gram sequence between two content data sets and Rouge-S measuring non-consecutive, n-gram sequences. For the Rough-L computation, the longest non-consecutive common sequence in the two content data sets above would be "I my password." For the Rouge-S computation, the sequence "I my" would also count as a 2-gram even though it is a nonconsecutive sequence. The precision, recall, and F1 score are calculated in a similar fashion as described above for the Rouge-N techniques.

Bleu software analysis techniques are determined in a similar fashion except that Bleu techniques focus on computing precision by using the number of n-grams in a "candidate" content data set as the denominator in the metric computations. Those of skill in the art will recognizes that the above techniques are non-limiting examples, and other suitable techniques can be used.

In other embodiments, content data is compared using various natural language processing techniques discussed above. For instance, the system can determine feature vectors for the content data files that compute attributes, such the number of paragraphs, sentences, words, headings, segments, the presence of particular pronouns, among other features. Features vectors for two content data files are compared to determine a measure of equivalence. Additional examples can include, without limitation comparing a sentiment and/or sentiment polarity for two content data files or comparing subject identification vectors between two content data files to detect similarities in subject identifications.

In yet other embodiments, data associated with the content data is compared, such as agent attribute data or end user data. That is, a content data file can be associated with an agent identification, an end user identification, end user geolocation data, or product identification data. Content data files involving the same agent, end user, product, geolocation, and the like are more likely to be considered similar when compared.

The Rouge analysis technique metrics, Bleu analysis technique metrics, feature vector values, sentiment identifications or polarity data, end user data, and agent data can be process by a neural network using predictive analysis software processing techniques to determine a probability that two content data files are similar. The various data elements are associated with weights and processed by nodes within the neural network to determine a probability that two content data files are related. For example, an analysis of training data might reveal that two shared experiences involving the same end user or involving end users from the same geographic location are more likely to be related. In that case, increased weights are attributed to the end user identification data or end user geolocation data in the neural network analysis.

Capturing Interactive Content Data and Connection Event Data

Connection event data can be input manually by a provider agent, end user, or recognized as part of a larger corpus of interactive content data. The connection event data can be stored to a database on the provider system together with a wide variety of additional data, such as agent data, end user data, subject identification data, or provider data, among others.

Connection events are classified according to a plurality of categories. In one embodiment the connection events are classified into one of more than one-hundred and fifty (150) different categories, such as volunteerism, customer outreach, or integrated relationship management where a provider agent performs functions that are above and beyond standard operations for a particular context.

Connection events are those that establish or enhance an existing connection between a provider and an end user. An almost innumerable number of distinct connection events are possible. The connection events generally include conditional data as well as interactive content data. Connection events can be better understood with the following simplified examples that could occur during a shared experience.

In one embodiment, an agent might recognize from reviewing end user data that it is the end user's birthday. The agent, recognizes based on conditional data that the current date matches the customer's birthday, and the agent generates interactive content data by wishing the customer a happy birthday. In another example, an agent might recognize from the conditional data that the end user recently obtained a home loan. In that case, the agent might generate interactive content data by congratulating the end user on the purchase of a new home.

In a further example, the agent might be assisting an end user with a product that limits the type and value of electronic transfers that an end user is permitted to make. The agent recognizes the conditional data that offering an alternative product to the end user would resolve the problem and be a more effective utilization of the end user's resources. The agent, thus, offers the alternative product to the user resulting an overall positive sentiment for the shared experience.

A connection event may occur as part of a shared experience, such as an in-person interaction, a series of instant chat messages between an end user and a human agent or chat bot, or a telephonic interaction. The connection event can be manually recorded to the provider system through an online portal or software application by an agent or end user that enters connection event data, such as: (i) sequencing data representing the date and time when the interactive content data was created or otherwise representing an order or sequence in which a shared experience reflected in the interactive content data occurred relative to other shared experiences; (ii) a narrative description of the connection event; (iii) connection event classification data; (iv) an end user identification; (v) agent identification data; (vi) provider data; and (vii) sentiment polarity data or sentiment scoring data.

Those of skill in the art will appreciate that the above types of data are not intended to be limiting, and the connection data can include other types of data relevant for utilizing and processing connection event data. For instance, in addition to the end user identification data, the connection data can include (iii) user contact data, including a mailing address or a geographic region where the user resides (e.g., a zip code, city, state); (iii) user source data, such as user telephone number data, user device IP Address data, an email address, or a social media account name; (iv) user demographic data, including the gender and age of a user; (v) one or more product identifications that indicate the accounts or products currently held by a user (e.g., a checking account, a home loan, brokerage account, etc.); (vi) user resource availability data (e.g., balances for various product types or account types associated with, or held by, a user); (vii) average resource availability data that indicates the average value of products or account balances maintained by the user over a given time period (e.g., an average monthly balance for an account held by the user); (viii) transaction data that includes data and information relating to user transactions, such as payment amounts, dates when a transaction occurred, data that identifies other parties to the transaction (i.e., a payment recipient), and information identifying a category of expenditures for the transaction (i.e., groceries, transportation, etc.); (ix) average resource utilization volume data indicating the average number of transactions a user conducts using a given product over a given time period (e.g., the number of resource expenditures per month for a given account or accounts); (x) user online activity data indicating user attempts to log into the provider system to access user accounts or other activities performed by users online or through a dedicated mobile device software application; or (xi) system configuration data, as described below.

The connection data can further be stored with agent data characterizing the agent involved with the connection event, such as: (i) agent role data that indicates an agent's position and operational responsibilities; (ii) agent experience data representing the duration an agent has been functioning in a particular job or role; (ii) agent location data indicating the particular provider location to which an agent is assigned. The connection data can also include various types of provider data, such as: (i) a provider line of business; (ii) a provider location where the connection event occurred; (iii) interaction driver identification data that classifies one or more underlying reason why the shared experience occurred (e.g., assisting with an electronic transfer, a deposit, or technical support); and (iv) resolution data indicating whether a particular user issue was resolved or not, and if so, how the issue was resolved (e.g., the issue is that a user forgot his or her password, and the resolution was a password reset).

Aside from manual entry, the system can automatically process interactive content data stored to the provider system to detect connection events using machine learning and natural language processing techniques. Examples of interactive content data can include transcripts of telephone conversations between an agent and an end user or transcripts of instant chat messages, SMS text messages, or other forms of written communication.

Provider-user interactions generally commence when a user initiates contact with a provider by telephone or written electronic communication (e.g., email, SMS text message, an instant chat message, or a social media message). The interactive content data can take the form of written electronic communications, or interactive content data can be generated by recording and transcribing telephonic communications between a user and a provider system or agent. Captured audio data is stored to the provider system and transcribed into alphanumeric text data using a speech-to-text software application and stored as interactive content data files comprising interactive content data. In some embodiments, the speech-to-text conversion is performed by a third party, and the provider system downloads and stores the interactive content data directly from the remote third party source.

The interactive content data can be stored directly to a provider system or stored to a third party database, such as a cloud service storage or software as a service provider. The interactive content data is stored to a relational database that maintains the interactive content data in a manner that permits the interactive content data files to be associated with certain information, such as agent data, end user data, provider data, or subject identifications. Storing to a relational database further facilitates expedient sorting of the data, such as retrieving interactive content data having time and date data (called "sequencing data") within a predefined range of dates.

Provider-user interactions generally commence when a user contacts a provider through an incoming interaction request. The incoming interaction request includes incoming interaction initialization data, which can be multi-frequency signal tones or data packets representing a user device IP address, email address, or digital routing information. The provider system includes a source identification software service that processes the incoming interaction initialization data to generate user source data, such as a telephone number, a user device Internet Protocol ("IP") Address, an email address, or a social media or other account name.

The source identification software service determines the telephone number of the incoming call source as incoming telephone number data using techniques that can include, for example, automatic number identification ("ANI"). In that case, the incoming interaction initialization data can be ANI data, which is generally transmitted along with an incoming telephone call using multi-frequency signaling, which can be a digital tone that is translated to a numeric value. For Voice-over-Internet Protocol ("VoIP") calling, the incoming telephone number can instead be received as packets of digital information within the incoming interaction initialization data. The source identification software service processes the incoming interaction initialization data (i.e., the ANI data or IP data packets) to determine the source data as incoming telephone number data. The provider system uses the incoming telephone number data to query an internal End User Database to determine whether the incoming telephone number corresponds to an existing provider customer.

When a user initiates a provider-user interaction by communicating with a provider through written electronic communications or VoIP, the communications originate from a user computing device, such as a personal computer, a smart phone, or tablet computing device. In that instance, the source identification software service processes the incoming initialization data to capture or determine user source data that can include a user device IP address for the user computing device, an email address, or a social media or other account name.

The provider system utilizes the user source data to transmit a query to the provider's internal End User Database to determine if an existing database record matches user source data. In this manner, either the incoming telephone number, the user device IP address, email address, or other user source data is used to determine to identity of the end user and whether the user is a current or former provider customer.

The provider system can further determine geographic location data based on the incoming telephone number data or user device IP address. The provider system can include a software application that transmits the incoming telephone number data or the user device IP address to an Identity & Location API that utilizes the phone number or IP Address to determine the approximate geographic location of the user computing device. The Identity & Location API can pass the incoming telephone number or user device IP address to a database or a third-party software service that returns geographic location data corresponding to an approximate geographic location for the telephone number or the user device IP address, such as a city, county, or state. The Identity & Location API stores the geographic data to a database record with the content data.

When users access a provider system through a user computing device, the provider system can capture additional elements of end user data. That is, end user data is captured when a user computing device is used to access the provider system to request data to be displayed on the user computing device. User computing devices access the provider system using an Internet browser software application to access the web server to display a provider webpage. Alternatively, user computing devices access the provider system through a provider mobile software application that displays GUI screens.

In accessing the provider system, the user computing device transmits a user interface transmit command to the web server that can include: (i) the device IP address for the user computing device; (ii) navigation data; and (iii) system configuration data. In response to the user interface transmit command, the web server returns provider display data and a digital cookie that is stored to the user computing device and used to track functions and activities performed by the user computing device. After receiving provider display data, the user computing device processes the display data and renders GUI screens presented to users, such as a provider website or a GUI within a provider mobile software application. Note that in some embodiments, the navigation data and system configuration data may be sent to the provider system in a separate message subsequent to the user interface transmit command message.

Navigation data transmitted by the user computing device generally includes information relating to prior functions and activities performed by the user computing device. Examples of navigation data include: (i) navigation history data (i.e., identifiers like website names and IP addresses showing websites previously access by the user computing device); (ii) redirect data (i.e., data indicating whether the user computing device selected a third-party universal resource locator ("URL") link that redirected to the provider web server); and (iii) search history data (e.g., data showing keyword searches in a search engine, like Google® or Bing®, performed by the user computing device).

Navigation history data allows a provider to determine whether a user computing device was previously used to visit particular websites, including the provider's own website. The navigation history data further indicates whether the user computing device accesses relevant third-party websites, such as websites that contain information concerning a particular product or service or websites that provide technical and other information relevant to resolving a problem experienced by a user. The navigation history data includes, without limitation: (i) URL data identifying a hyperlink link to the website; (ii) website identification data, such as a title of a visited website; (iii) website IP address data indicating an IP address for a web server associated with a visited website; and (iv) time stamp data indicating the date and time when a website was accessed.

Search history data is generated when a user computing device runs a query within a search engine. The search history data can include, without limitation: (i) a search engine identifier indicating the search engine that was utilized; (ii) search parameter data indicating the alphanumeric strings or operators used as part of a search query (e.g., Boolean operators such as "AND" or "OR" or functional operators, like "insite" used to search the contents of a specific website); and (iii) time stamp data indicating the date and time a search was performed.

The user computing device may also transmit system configuration data to the provider system that is used to evaluate a user or authenticate the user computing device. System configuration data can include, without limitation: (i) a unique identification for the user computing device (e.g., a media access control ("MAC") address hardcoded into a communication subsystem of the user agent computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and ascertaining the subject identifications underlying a support request or user communication.

Processing and Utilization of Connection Event Data

The system processes interactive content data using machine learning, natural language processing and sentiment analysis to detect connection event data that includes alphanumeric text. In one embodiment, the system is trained using a corpus of interactive content training data that includes known, pre-identified connection events according to connection event subject identifications. The interactive content training data can further include a wide variety of information, such as end user data, agent data, and provider data.

The training data is processed by neural networks to identify a probability that the interactive content data includes a connection event, and if so, to further identify the connection event subject identification. The weights of the nodes within the neural network are adjusted until the calculated probabilities reach an acceptable threshold.

To illustrate the detection of connection events, the system might recognize that connection events are associated with particular characteristics, such as a change in sentiment data such as sentiment polarity or a sentiment score. In that case, detecting a change in sentiment polarity or score would be reflected in the neural network analysis by increase the weight of a particular node within the network corresponding to sentiment data. In another example, the system might recognize that connection events are more likely to occur during a particular time of day (e.g., from 10 a.m. to noon), at a particular provider location, during a particular type of shared experience (e.g., a call about a disabled or locked account, or technical support), or when particular words or phrases are used (e.g., "birthday," "congratulation," or "reduced fee"). The factors such as sequencing data, location data, or interaction driver identification data would weigh more heavily in the neural network analysis and be more likely to correspond to a connection event.

Those of skill in the art will appreciate that other techniques can be used to facilitate or supplement identification of connection events in a corpus of interactive content data. For instance, the system can compare the language of known connection events to interactive content data to identify when similar language through the use of software processing techniques such as Rouge or Blue discussed above. Interactive content data is screened using such techniques could be subject to a further analysis using neural networking techniques to identify connection events.

Once identified, the connection event data is associated with sequencing data or a sequencing range (e.g., a begin and end time) and stored to a database with alphanumeric text or communication data representing the ideas and content data exchanged during the connection event. The connection event data can also be associated with end user data, agent data, and provider data.

Figure 7:
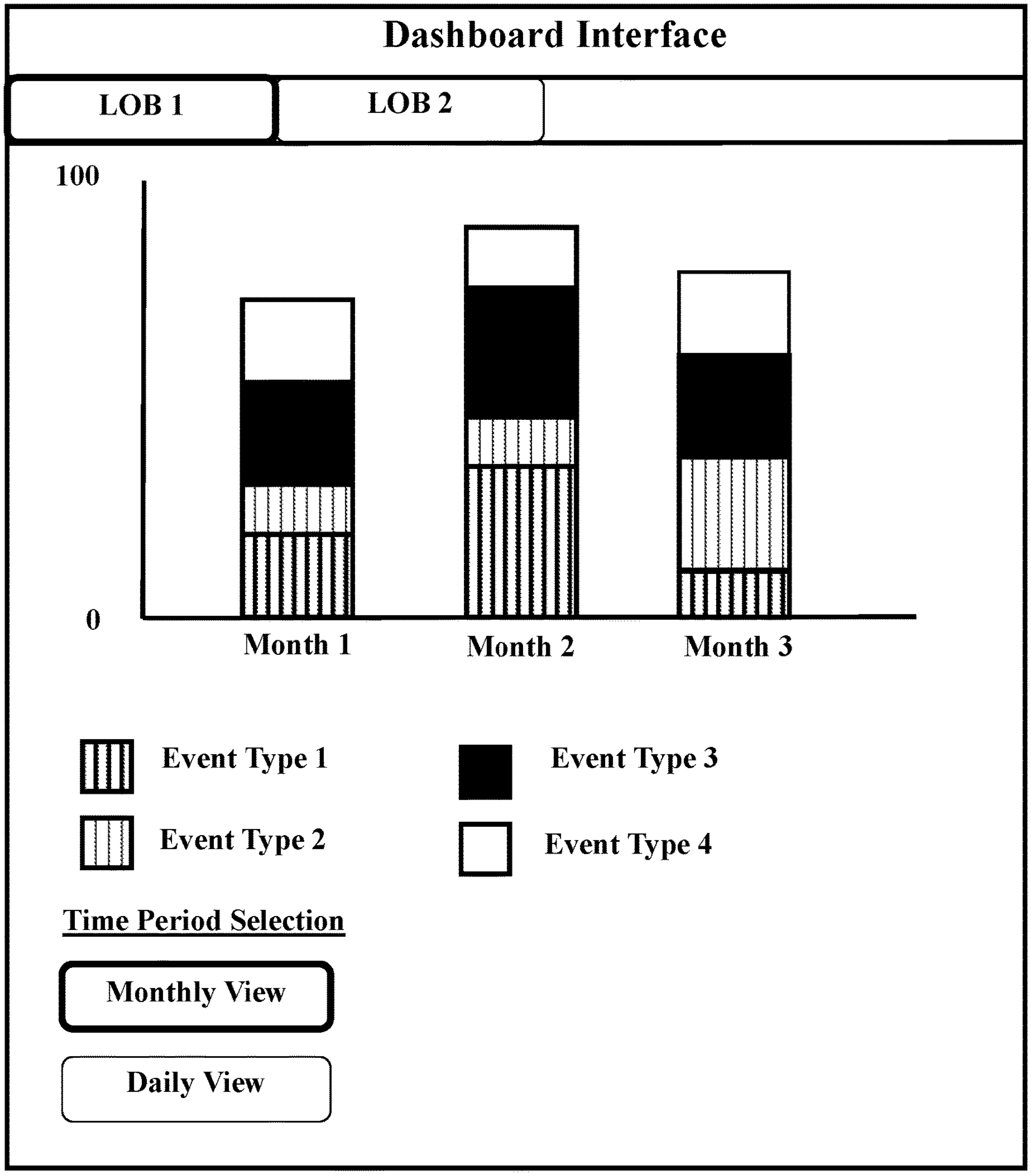
FIG. 7 is a first example graphical user interface for displaying connection data.

The connection event data can be displayed on an agent computing device display screen on a Dashboard Graphical User Interface ("GUI"). The Dashboard GUI can display, for example, the number and/or type of connection events that occurred during a specified time period for a particular provider line of business. An example Dashboard GUI is shown in FIG. 7 representing the types of connection events that occurred each month for a particular line of business ("LOB").

Figure 8:
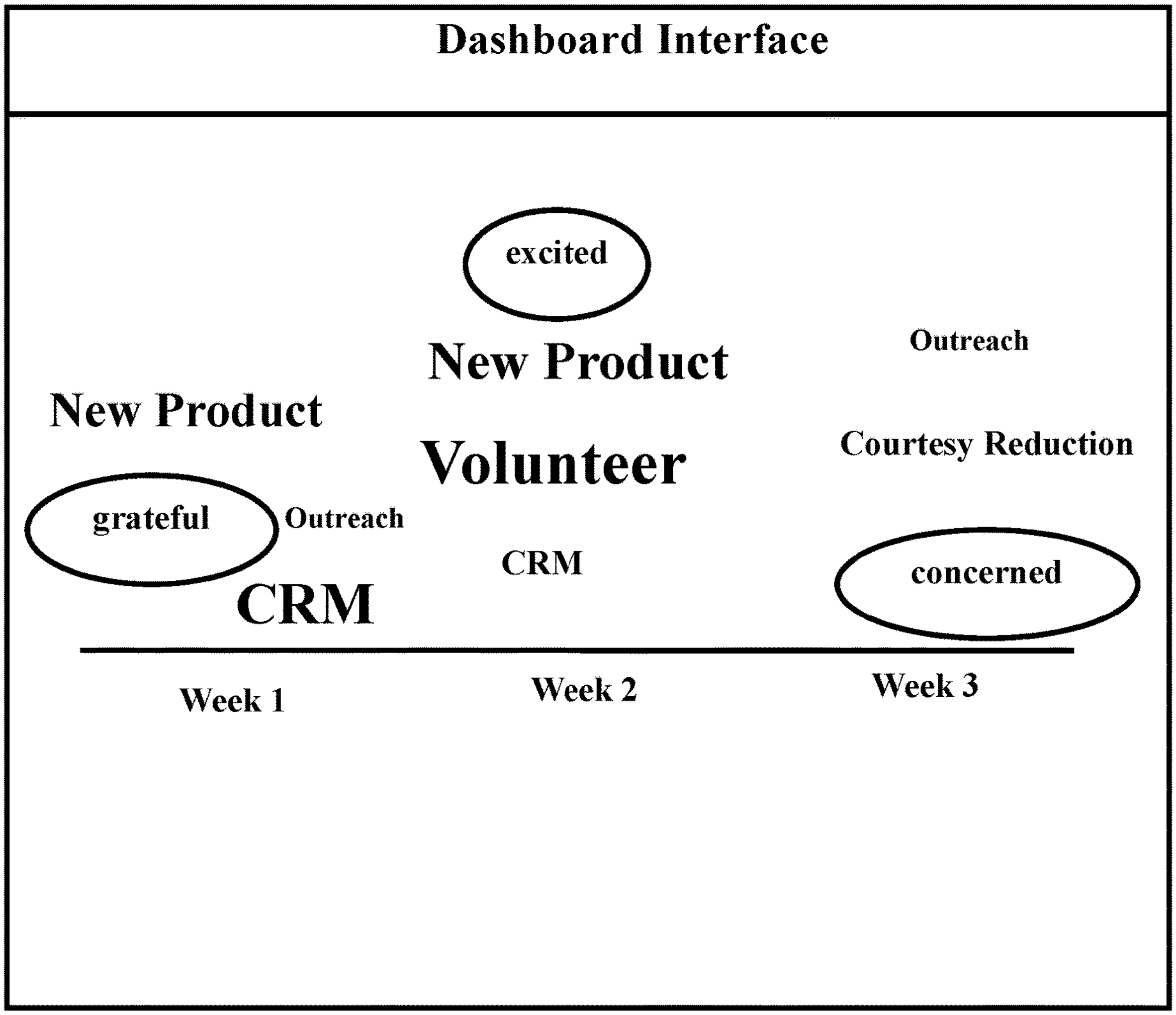
FIG. 8 is a second example graphical user interface for displaying connection data.

Other visualizations can include, for example, the word cloud shown in FIG. 8 where sentiment is shown in an oval for each week, and the size and position of the adjacent words indicate a frequency of occurrence for connection event types. Skilled artisans will appreciate that other types of Dashboard GUIs are possible, including displays that track connection event data according to provider location, agent, customer location, or interaction driver identification.

The connection event data can be analyzed using the system dashboards to draw conclusions concerning the frequency, efficacy, or other impacts of connection events. The connection event data can be used for operations that include, without limitation, system improvements, agent training, and communication design. Utilizing the connection event data can begin by specifying a series of operational instructions to implement the connection event and conditional data that controls when and under what conditions the connection event is to occur.

In one example, the connection event data is used to develop operational instructions and conditional data for a "chat bot" that causes the chat bot to output particular content data when specified conditions are recognized. In one simplified example, the chat bot can analyze conditional data to recognize it is an end user's birthday, before performing operational instructions that cause the chat bot to output content data wishing the end user a happy birthday.

The connection events can also be used to implement other system optimizations or improvements. The provider first generates a hypothesis based on the event connection data. Hypotheses generally take the form of a suggested solution, such as a process improvement or agent action, and an expected result (i.e., success criteria) from the suggested solution. A hypothesis testing process is then used to develop and implement experiments to test the hypotheses solutions to determine whether the success criteria are met.

To illustrate the implementation of system improvements using hypothesis testing, the provider might observe a plurality of instances where an expedited service fee was waived for end users exhibiting a significant negative polarity. The provider could hypothesize that such a connection event results in a reversal of sentiment polarity from positive to negative and a reduced resolution time for the shared experience (e.g., the "success criteria"). The provider tests the hypothesis over a set of shared experiences measuring the polarity and duration of each shared experience. If the results show that the success criteria are met—i.e., the sentiment polarity is reversed and shared experience durations are reduced—then the connection event can be implemented as an enterprise wide process enhancement and optimization.

In yet other embodiments, the connection event data is utilized to design and enhance provider communication. Communications are designed to include content from connection events observed during system operation or to specify the frequency of occurrence for connection events, thereby encouraging end users to engage in further connection events during shared experiences with provider agents.

The useful applications of the connection event data can include developing and delivering targeted and effective training modules to provider agents concerning the performance of connection events. The training modules include operational instructions, conditional data generated from the connection event data, and training material data. The training material data includes audio, video, and other data from shared experiences that were enhanced or optimized by the occurrence of a connection event. The selected connection event data is submitted to a Training Content Creation Tool software application where the connection data is combined with other sources to create targeted simulations and other efficient and effective training modules.

The training modules can comprise training instructions to be performed by the agent and/or agent computing device, such as displaying, receiving, and evaluating answers to questions, displaying knowledge assets, or running a shared experience simulation. The training module can track training results from the performance of training modules, such as the number of questions answered correctly and incorrectly, the topic of the questions answered incorrectly, the length of time it takes to complete a question or training module, or other useful performance metric.

The training module can be comprised of one or more digital assets, which again are module units of knowledge that can take a variety of forms. The digital assets can be informational displays through text, portable document format files, web-based interface displays, simulation software applications or executables, or other suitable formats known to those of skill in the art. In some embodiments, the training modules can take the form of a web-based interface performed through an Internet browsing software application running on the agent computing device.

Training modules can be delivered transmitted to provider agents for reinforced learning and encouragement of connection events, or training modules can be transmitted to newer agents with less than a given tenure duration. In this manner, a provider can identify and test connection events representing process optimizations and enhancements and disseminate knowledge to provider agents that permits the agents to implement such improvements by carrying out specified operational instructions when specified conditional data is present.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for detection and utilization of end user connection events comprising a computer that includes at least one processor and a memory device storing data and executable code that, when executed, causes the at least one processor to:

(a) activate a digital recorder that captures interactive communications and stores the interactive communications to the memory device as an interactive content file;

(b) detect connection event data representing a connection event within the interactive content file and sequence data range designating a beginning and an end for the connection event;

(c) generate a connection event subject identification associated with the connection event data;

(d) determine sentiment data corresponding to the connection event, wherein (i) the sentiment data has a positive polarity or a negative polarity, (ii) when the sentiment data has a positive polarity, generate operational instructions, (iii) when the operational instructions are executed by an agent computer, the operational instructions cause the agent computer to display alphanumeric text comprising a list of input functions selectable by an agent; and (e) transmit the operational instructions to an agent computing device for execution.

2. The system for detection and utilization of end user connection events of claim 1, wherein executing the executable code further causes the processor to:

(a) generate an experimental hypothesis using the connection event data that includes (i) proposed operational instructions for implementing the connection event by the agent computer, (ii) conditional data specifying conditions that must be met before the proposed operational instructions are executed;

(iii) success criteria that is satisfied or not based on the interactive content data;

(b) transmit the experimental hypothesis to the agent computer that generates interactive content data by executing the proposed operational instructions; and (c) compare interactive content data received from the agent computer to determine whether the success criteria is satisfied.

3. The system for detection and utilization of end user connection events of claim 1, wherein executing the executable code further causes the processor to:

(a) generate conditional data specifying conditions that must be met before the operational instructions are implemented; and (b) run a chat bot software application that executes the operational instructions when the conditional data is met.

4. The system for detection and utilization of end user connection events of claim 1, wherein executing the executable code further causes the processor to:

(a) generate a training module that comprises (i) training operational instructions for implementing a connection event by the agent computer, (ii) conditional data specifying conditions that must be met before the training operational instructions are executed, and (iii) training material data; and (b) transmit the training module to the agent computer, wherein the agent computer executes the training operational instructions, wherein when the agent computer executes the training operational instructions, the training operational instructions cause the agent computer to display the training material data.

5. The system for detection and utilization of end user connection events of claim 1, wherein:

(a) the computer comprises a first neural network; and (b) the first neural network is used to detect the connection event data.

6. The system for detection and utilization of end user connection events of claim 5, wherein the first neural network is selected from one of (i) a multilayer perceptron network having three or more layers and that utilizes a nonlinear activation function, (ii) a convolutional neural network; (iii) a recursive neural network, (iv) a recurrent neural network; (v) a Long Short-Term Memory network architecture, or (vi) a Bidirectional Long Short-Term Memory network.

7. The system for detection and utilization of end user connection events of claim 6, wherein:

(a) the computer comprises a second neural network; and (b) the second neural network determines the connection event subject identification.

8. The system for detection and utilization of end user connection events of claim 7, wherein the second neural network is selected from one of (i) a Latent Semantic Analysis network, (ii) a Probabilistic Latent Semantic Analysis network, or (iii) a Latent Dirichlet Allocation network.

9. The system for detection and utilization of end user connection events of claim 1, wherein executing the executable code further causes the processor to display the sentiment data on the dashboard GUI.

10. The system for detection and utilization of end user connection events of claim 1, wherein:

(a) the computer comprises a neural network;

(b) the neural network is used to determine the sentiment data; and (c) the neural network is selected from one of (i) a Naive Bayes, Support Vector Machine that uses logical regression, (ii) a convolutional neural network, (iii) a lexical co-occurrence network, or (iv) a Long Short-Term Memory network.

11. A system for detection and utilization of end user connection events comprising a computer that includes at least one processor and a memory device storing data and executable code that, when executed, causes the at least one processor to:

(a) activate a digital recorder that captures interactive communications and stores the interactive communications to the memory device as an interactive content file;

(b) detect connection event data representing a connection event within the interactive content file;

(c) determine sentiment data corresponding to the connection event, wherein the sentiment data has a positive polarity or a negative polarity;

(d) when the sentiment data has a positive polarity, generate both (i) operational instructions for implementing the connection event by an agent, wherein when the operational instructions are executed by an agent computer, the operational instructions cause the agent computer to display alphanumeric text comprising one or more input functions selectable by an agent, and (ii) conditional data specifying conditions that must be met before the operational instructions are implemented; and (e) transmit the operational instructions and the conditional data to the agent computer for execution of the operational instructions when the conditional data is met.

12. The system for detection and utilization of end user connection events of claim 11, wherein:

(a) the computer comprises a first neural network; and (b) the neural network is used to detect the connection event data.

13. The system for detection and utilization of end user connection events of claim 12, wherein the first neural network is selected from one of (i) a multilayer perceptron network having three or more layers and that utilizes a nonlinear activation function, (ii) a convolutional neural network; (iii) a recursive neural network, (iv) a recurrent neural network; (v) a Long Short-Term Memory network architecture, or (vi) a Bidirectional Long Short-Term Memory network.

14. The system for detection and utilization of end user connection events of claim 11, wherein executing the executable code further causes the processor to render a connection event dashboard graphical user interface ("GUI") displayed on the screen of the agent computer, wherein the connection event dashboard shows connection events as a function of sequence data.

15. The system for detection and utilization of end user connection events of claim 11, wherein the operational instructions and conditional data are integrated with a chat bot software application that executes the operational instructions when the conditional data is met.

16. A system for detection and utilization of end user connection events comprising a computer that includes at least one processor and a memory device storing data and executable code that, when executed, causes the at least one processor to:

(a) record connection event data representing a plurality of connection events and sequence data corresponding to each connection event, (b) determine a connection event subject identification for each connection event;

(c) determine a sentiment score and a sentiment polarity for each connection event, wherein the sentiment polarity is a positive sentiment polarity or a negative sentiment polarity;

(d) render a connection event dashboard graphical user interface ("GUI") displayed on the screen of an agent computer, wherein the connection event dashboard displays (i) a plurality of connection events that each have a positive sentiment polarity, (ii) each connection event as a function of sequence data, and (iii) each connection event as associated with the connection event subject identification.

17. The system for detection and utilization of end user connection events of claim 16, wherein executing the executable code further causes the processor to:

(a) generate both (i) operational instructions for implementing the connection event by an agent, wherein when the operational instructions are executed by an agent computer, the operational instructions cause the agent computer to display alphanumeric text comprising input functions selectable by an agent, and (ii) conditional data specifying conditions that must be met before the operational instructions are implemented; and (b) transmit the operational instructions and conditional data to the agent computer for execution of the operational instructions when the conditional data is met.

18. The system for detection and utilization of end user connection events of claim 16, wherein executing the executable code further causes the processor to:

(a) generate both (i) operational instructions for implementing the connection event by an agent, and (ii) conditional data specifying conditions that must be met before the operational instructions are implemented; and (b) integrate the operational instructions and conditional data with a chat bot software application that executes the operational instructions when the conditional data is met.

19. The system for detection and utilization of end user connection events of claim 16, wherein executing the executable code further causes the processor to:

(a) generate an experimental hypothesis using the connection event data that includes (i) operational instructions for executing the connection event by an agent, (ii) conditional data specifying conditions that must be met before the operational instructions are executed;

(iii) success criteria that is satisfied or not based on the interactive content data;

(b) transmit the experimental hypothesis to the agent computer that generates interactive content data by executing the operational instructions; and (c) compare interactive content data received from the agent computer to determine whether the success criteria is satisfied.

20. The system for detection and utilization of end user connection events of claim 16, wherein executing the executable code further causes the processor to:

(a) generate a training module that comprises (i) operational instructions for implementing a connection event by the agent computer, (ii) conditional data specifying conditions that must be met before the operational instructions are executed, and (iii) training material data; and (b) transmit the training module to an agent computer, wherein the agent computer executes the operational instructions.

* * * * *